United States Patent
Menzel et al.

(10) Patent No.: US 9,143,363 B2
(45) Date of Patent: Sep. 22, 2015

(54) METHOD FOR CHANNEL ESTIMATION IN VEHICLE-TO-ENVIRONMENT COMMUNICATION AND COMMUNICATION DEVICE ARRANGED THEREFOR

(75) Inventors: Marc Menzel, Weimar (DE); Sighard Schräbler, Karben (DE); Ulrich Stählin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/112,478

(22) PCT Filed: Mar. 7, 2012

(86) PCT No.: PCT/EP2012/053911
§ 371 (c)(1),
(2), (4) Date: Oct. 17, 2013

(87) PCT Pub. No.: WO2012/143169
PCT Pub. Date: Oct. 26, 2012

(65) Prior Publication Data
US 2014/0050258 A1  Feb. 20, 2014

(30) Foreign Application Priority Data

Apr. 18, 2011  (DE) .......................... 10 2011 017 473

(51) Int. Cl.
*H04L 25/02* (2006.01)
*H04B 7/00* (2006.01)
*H04L 27/28* (2006.01)
(Continued)

(52) U.S. Cl.
CPC .............. *H04L 25/0202* (2013.01); *H04B 7/00* (2013.01); *H04B 17/391* (2015.01); *H04L 25/02* (2013.01);
(Continued)

(58) Field of Classification Search
CPC ......... H04L 25/02; H04L 27/26; H04L 27/00; H04L 27/28; H04L 12/26; H04B 17/00; H04B 7/00
USPC ................. 375/224, 232–233, 260, 340–343; 370/252, 329, 336
See application file for complete search history.

(56) References Cited

U.S. PATENT DOCUMENTS 6,563,861 B1 *  5/2003  Krasny et al. ................. 375/150
6,680,969 B1 *  1/2004  Molnar et al. ................. 375/224
(Continued)

FOREIGN PATENT DOCUMENTS

DE  10 256 620 A1  7/2004
WO  WO 2006/073691 A2  7/2006
WO  WO 2008/085093 A1  7/2008

OTHER PUBLICATIONS

Johan Karedal, Fredrik Tufvesson, Nicolai Czink, Alexander Paier, Charlotte Dumard, Thomas Zemen, Christoph F. Mecklenbräuker, Andreas F. Molisch; "A Geometry-Based Stochastic MIMO Model for Vehicle-to-Vehicle Communications"; IEEE Transactions of Wireless Communications, vol. 8, No. 7, Jul. 1, 2009, pp. 3646-3657, XP011264139, ISSN: 1536-1276.

*Primary Examiner* — Daniel Washburn
*Assistant Examiner* — Eboni Hughes
(74) *Attorney, Agent, or Firm* — Cozen O'Connor

(57) ABSTRACT

The invention relates to a method and a correspondingly arranged communication device for channel estimation in vehicle-to-environment communication, wherein a model of the environment influencing the vehicle-to-environment communication is produced from parameters of a vehicle-to-environment communication and the quality of the model for the environment is ascertained by the convergence of the parameters used in the model. The course of the convergence of the parameters in the model is monitored and conclusions are drawn with regard to the environment from the course of the convergence of the parameters.

7 Claims, 3 Drawing Sheets

(51) Int. Cl.
*H04B 17/391* (2015.01)
*H04B 17/00* (2015.01)
*H04L 12/26* (2006.01)
*H04L 27/26* (2006.01)
*H04L 27/00* (2006.01)

(52) U.S. Cl.
CPC ................ *H04L 27/28* (2013.01); *H04B 17/00* (2013.01); *H04L 12/26* (2013.01); *H04L 27/00* (2013.01); *H04L 27/26* (2013.01)

(56) References Cited

U.S. PATENT DOCUMENTS

| | | |
|---|---|---|
| 2004/0176038 A1* | 9/2004 | Luo et al. .................... 455/67.11 |
| 2006/0013340 A1* | 1/2006 | Reid .............................. 375/340 |
| 2006/0149475 A1 | 7/2006 | Kellum et al. |
| 2006/0164292 A1 | 7/2006 | Buechler et al. |
| 2010/0081426 A1 | 4/2010 | Larsson et al. |

* cited by examiner

US 9,143,363 B2

METHOD FOR CHANNEL ESTIMATION IN VEHICLE-TO-ENVIRONMENT COMMUNICATION AND COMMUNICATION DEVICE ARRANGED THEREFOR

CROSS-REFERENCE TO RELATED APPLICATIONS

This is a U.S. national stage of application No. PCT/EP2012/053911, filed on 7 Mar. 2012, which claims priority to the German Application No. 10 2011 017 473.7, filed: 18 Apr. 2011, the content of both incorporated herein by reference.

BACKGROUND OF THE INVENTION

1. Field of the Invention

The present invention relates to a method for channel estimation in vehicle-to-environment communication (C2X communication), in which a model of the environment influencing vehicle-to-environment communication is generated from parameters of vehicle-to-environment communication. The quality of the model for the environment is ascertained by the convergence of the parameters used in the model.

2. Prior Art

The data to be transmitted is initially modulated digitally in a digital transmission system. This is also referred to as symbol mapping. A continuous-time baseband signal is generated in a pulse shape filter. Before the signal is able to be transmitted via the actual transmission channel, the baseband signal is transformed into a so-called bandpass signal, for example, with the aid of a quadrature modulator.

On the receiver side, the reception signal is transformed back into a baseband signal via a corresponding quadrature modulator, specific interference suppression mechanisms possibly following after this inverse transformation.

The transmission channel is determined by the physical communications properties of the system. However, it is possible to match the transmitting signal optimally to the properties of the channel using a suitable choice of transmission and modulation methods, which are influenced by the environment of the transmitter and the receiver. On the receiver side, so-called channel estimation is then frequently carried out in order to be able to compensate for distortion occurring via the transmission channel. For this purpose, reference signals are often inserted into the data stream at the transmitter, via which the receiver receives information about the channel transfer function. Based on this information, it is then possible to estimate the channel transfer function with the aid of a model. The known channel estimation methods generate a model of the environment, information from the communication itself being used.

A radar system designed as an environment sensor is known from DE 10256620 A1, which has means for both sensing and data transmission, these means being able to be operated simultaneously using different frequency ranges for sensing and data transmission. Although this has the advantage of making it possible to use largely the same hardware for both data transmission and sensing, various measurements are required, each of which must be activated and evaluated separately.

WO 2006/073691 A2 describes a method in which information about the relative distance between the vehicles is obtained by evaluating a communication channel between two vehicles. For this purpose, current transmission power or transmission power calculated in a model and received transmission strength are taken into consideration, the receiver ascertaining the distance from the transmission power and the received transmission strength based on a model of free radio transmission. This necessarily requires communication between the various communications partners. In addition, satellite positioning systems may be used for improving the determination of the relative distance, transmission losses being determined on the transmission channel between vehicles having a satellite positioning system and being correspondingly used on vehicles without a satellite positioning system, in order to improve the distance estimation for vehicles in the same vehicle cluster. Here as well, an alternative sensor system must be used in order to obtain an assessment of the environment.

SUMMARY OF THE INVENTION

An object of the present invention is therefore to provide an option of inferring environmental parameters from the communication itself.

This object is achieved according to the present invention through a method and a transmission device which has been set up in a corresponding manner to the method in which the course of convergence of the parameters in the model for the environment is monitored and conclusions about the environment are drawn from the course of convergence of the parameters.

The present invention makes use of the fact that the parameters used in the models for channel estimation in a radio environment, in which the transmission channel as such remains the same, converge to a specific value. That is, once the parameters have been determined, they no longer change within smaller limits. This applies in particular if the model, which performs radio modeling of the transmission, is well suited to the actual conditions. The course of convergence of the parameters of a model for channel estimation therefore allows conclusions to be drawn about the actual environment of the receiver, so that the medium of the vehicle-to-environment communication may be used within certain limits as an environmental sensor of a motor vehicle or more generally of a receiver of the vehicle-to-environment communication.

In accordance with one aspect of the present invention multiple models are used for channel estimation within the method, a typical environment being assigned to each model, in which environment this model describes the radio channel especially well. In a model of this kind, the parameters exhibit especially good convergence behavior; that is, they are essentially constant in time over a predefined meaningful evaluation period. Based on the convergence of the parameters in at least one model, it is then possible to select the suitable model and thus ascertain the environment of the receiver in the context of an environmental sensor system.

In accordance with an aspect of the present invention, the convergence for the parameters may be evaluated simultaneously for a plurality of various models for channel estimation, which are assigned to different environments, the model having the best convergence, that is, the model in which the parameters currently change the least during the monitored time interval, being selected. This selection is valid for both determining the C2X communication parameters and ascertaining the environment of the communication subscriber in the context of the environmental sensor system.

In another aspect, in order to achieve overall stable channel estimation behavior, a hysteresis value and/or a threshold value is assigned to the course of convergence of the parameters, especially after a change of the model for channel estimation, which must be exceeded before an additional change of the model for channel estimation occurs. By specifying hysteresis or threshold values, excessively large fluctuations, and thus excessively frequent and rapid changes of the estimators or the channel estimation model, may be easily avoided in the event of only minor changes in the environment of the receiver which affect the radio channel.

As an addition to or modification of the method described immediately above, the course of convergence of the parameters for channel estimation may also be classified, wherein a value is assigned to each class, which indicates whether a switch must be made to a channel estimation model, and if so, to which. In the case of optimal channel estimation, the classification thus indicates that switching is not necessary. Depending on the degree of convergence, it is thus possible to predefine the other model to which to switch if the convergence proves not to be altogether optimal. It has been shown that for typical changes in the environment, the parameters or their convergence behavior exhibits behavior corresponding to the change, which is a function of the type of change in the environment and which may correspondingly be assigned. Using suitable classification, it is thus possible to make specifications which have already been targeted for changing a model without necessarily having to examine other models. Using classification, which according to the present invention may also be carried out in addition to a selection from multiple different models based on the evaluation of the convergence behavior in each of these models, it is also generally possible to limit the evaluation of the convergence to just one model, thus saving computing time, and accordingly implementing the computing units more economically.

Further, after a change of the channel estimation model, it is possible to optimize a new model for channel estimation using data from the previous channel estimation and/or the vehicle-to-environment communication, the period from which the data is selected for optimization being parameterizable, depending on the model if applicable. The time scale for using such data may logically lie in the range of seconds up to minutes, the duration in particular also being ascertainable as a function of the time constant of the change in convergence.

To improve the method, after selecting the model for channel estimation, which enables a rough estimation of the environment in the context of a rough environmental sensor system, it may further be proposed to perform a detailed evaluation of the parameters within the channel estimation model, in order to obtain additional detail about the environment. This may be achieved according to the present invention, for example, by assigning specific parameter constellations to specific typical environmental features. The slope or curvature of a convergence curve of a parameter may also be evaluated as part of a detailed evaluation.

According to an aspect of the present invention, it is possible to ascertain the course of convergence for each parameter of the model individually or to combine the course of convergence for all or some parameters into an overall or partial convergence. Combining into a partial convergence, or in particular, an overall convergence, has the advantage of making it possible to implement the method more easily and requiring less computing capacity. On the other hand, the consideration of the convergence behavior of each of a number of different parameters individually allows better mapping of the environment, in particular, because it is truer to detail.

According to an aspect of the present invention, in order to evaluate the course of convergence of a parameter, the current value of this parameter, after forming its absolute value if necessary, may be logarithmized and averaged with various averaging time constants, wherein a difference, is formed from the value of the parameter and each of the various average values, and a sign change or transition in the differences is evaluated. For example, three different averaging value filters having different averaging time constants may be used for this. From the evaluation result, it is possible to select a suitable model for the channel estimation.

Finally, as aspect of the present invention also relates to a communication device for vehicle-to-environment communication (C2X) having a transmitter and/or receiver for transmitting and/or receiving communication messages in vehicle-to-environment communication and a computing unit equipped for carrying out the communication, wherein a method for channel estimation is also implemented in the computing unit. In order also to obtain information about the environment of the receiver of the vehicle-to-environment communication from the channel estimation, that is, the physical properties of the transmission channel, it is proposed according to the present invention that the prescribed method for channel estimation is completely or partially implemented in the computing unit.

Additional advantages, features, and potential applications of the present invention also result from the following description of an exemplary embodiment and the drawings. All features described and/or depicted individually or in any combination form the subject matter of the present invention, regardless of their summary in the claims or their references.

BRIEF DESCRIPTION OF THE DRAWINGS

Exemplary embodiments of the invention are explained below with reference to the schematic drawings, in which.

DETAILED DESCRIPTION OF THE PRESENTLY PREFERRED EMBODIMENTS

In order to improve radio communication transmission quality, in particular, vehicle-to-environment communication, for example, with the aid of automotive WLAN in accordance with the IEEE 802.11p standard, as well as other communication systems such as GPRS, EDGE, UMTS, LTE, WiMax, WLAN in accordance with IEEE 802.1a/b/g/n/etc., Bluetooth, ZigBee, or RKE key radio, so-called channel estimation methods are typically used, which model the physical properties of the transmission channel in order to be able to ascertain optimum settings for radio transmission.

These models use parameters which, depending on the suitability of the model for the respective environment, are converged or converge better or more poorly, that is, remain constant (good convergence) or change (poor convergence) over a specific period under consideration.

Figure 1:
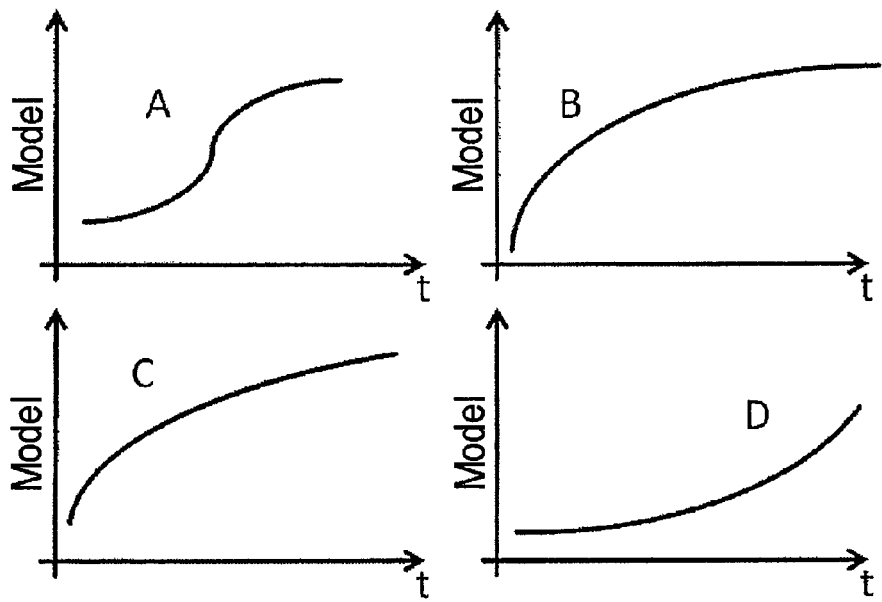
FIG. 1 is a diagram that shows the convergence behavior of the parameters of various models A, B, C, and D over time.

In FIG. 1, the convergences of a parameter are depicted for various models A, B, C, and D, which have been ascertained in a radio communication by the receiver, models A, B, C, D symbolizing various environments of the receiver. These environments may, for example, be cities, open landscape, tunnels, or the like.

It can be seen that overall, the parameter of model B, after initially poorer convergence, converges best, since the convergence curve becomes flatter with increasing time. Expressed differently, the time derivative (d/dt) of the curve is considered. If no significant change results here, the parameter converges. The same applies to model C, the curve here being somewhat steeper with increasing time. Model A is subject to greater fluctuation over the period under consideration, and model D results in greater divergence with increasing time.

Here, an evaluation of the divergence behavior would thus take place, for example, by evaluating the slope of the various divergence curves over time, a slope that is as low as possible expressing especially good convergence.

In the present case, model B would thus be selected as the model having the optimal convergence, and would be used both for determining the settings in the vehicle-to-environment communication and for identifying the environment of the transmitter.

If a model has multiple parameters, an evaluation of this kind may be performed for each parameter, a suitable weighting of the individual parameters then being predefined in order to select the optimal overall model.

Figure 2:
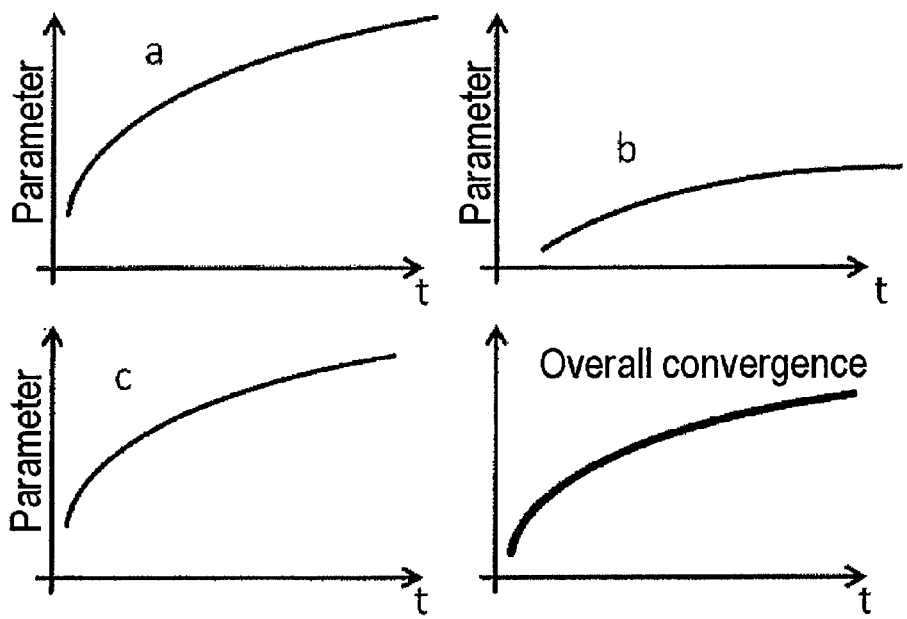
FIG. 2 is a diagram that shows the convergence behavior of various parameters a, b, c of a model and the combined overall convergence of these parameters over time.

FIG. 2 shows a differing practice, in which the various parameters a, b, and c of one model are combined into an overall convergence for the overall model. An overall convergence of this kind would result, for example, for each of the various models A, B, C, D according to FIG. 1, if multiple parameters are used in the model.

Figure 3:
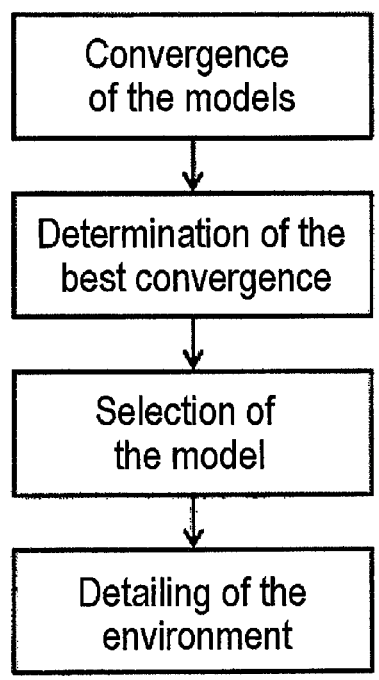
FIG. 3 is a flow diagram for carrying out the method according to the present invention according to a first specific embodiment.

In FIG. 3, an option for carrying out the method according to the present invention is proposed, in which a method for channel estimation is implemented in a computing unit of a communication device, in which the convergence is examined in parallel for a plurality of different models and, similarly to the depiction in FIG. 1, the model having the best convergence is selected. For this purpose, the convergence of each of the models is determined, and the model having the best convergence is ascertained. This model is then used both for ascertaining the optimal communication settings and for ascertaining the environment, and thus acts as an environmental sensor according to the present invention.

After the model has been selected, additional detailing may be performed by taking into consideration an overall parameter or each individual parameter and its convergence. For example, the convergence of specific parameters may be used to infer the height of a development in a city, or the like.

Figure 4:
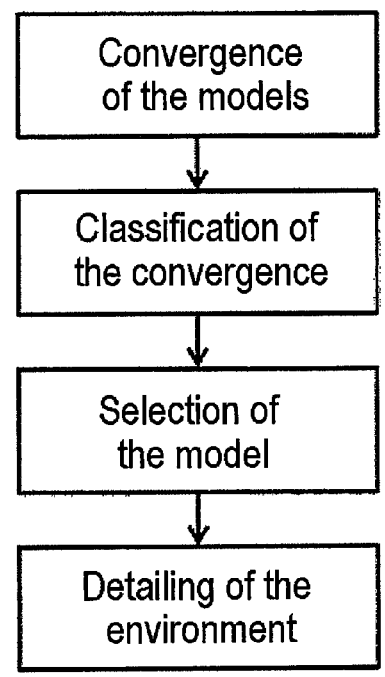
FIG. 4 is a flow diagram for carrying out the method according to the present invention according to a second specific embodiment.

This detailing takes place following the selection of a model from a predefined plurality of models, for each of which a convergence is calculated. This method is relatively computationally intensive and may also be replaced by the following method described with reference to FIG. 4.

In this case, only the convergence of the model used directly for channel estimation of the transmission channel is ascertained, a classification of the convergence taking place which may be different from model to model and may contain the variability, slope of the convergence curve, or other criteria. From this classification, it is possible to derive the model that best describes the instantaneous transmission behavior in the transmission channel. It may be concluded that the present model already contains the best description, so that the environment is already described optimally. If the description of the environment is not optimal, the suitable new model may be selected directly based on the classification of the parameter or parameters.

In addition, detailing of the environment may also take place in this method with the aid of detailed evaluations of the convergence of the parameters.

Figure 5:
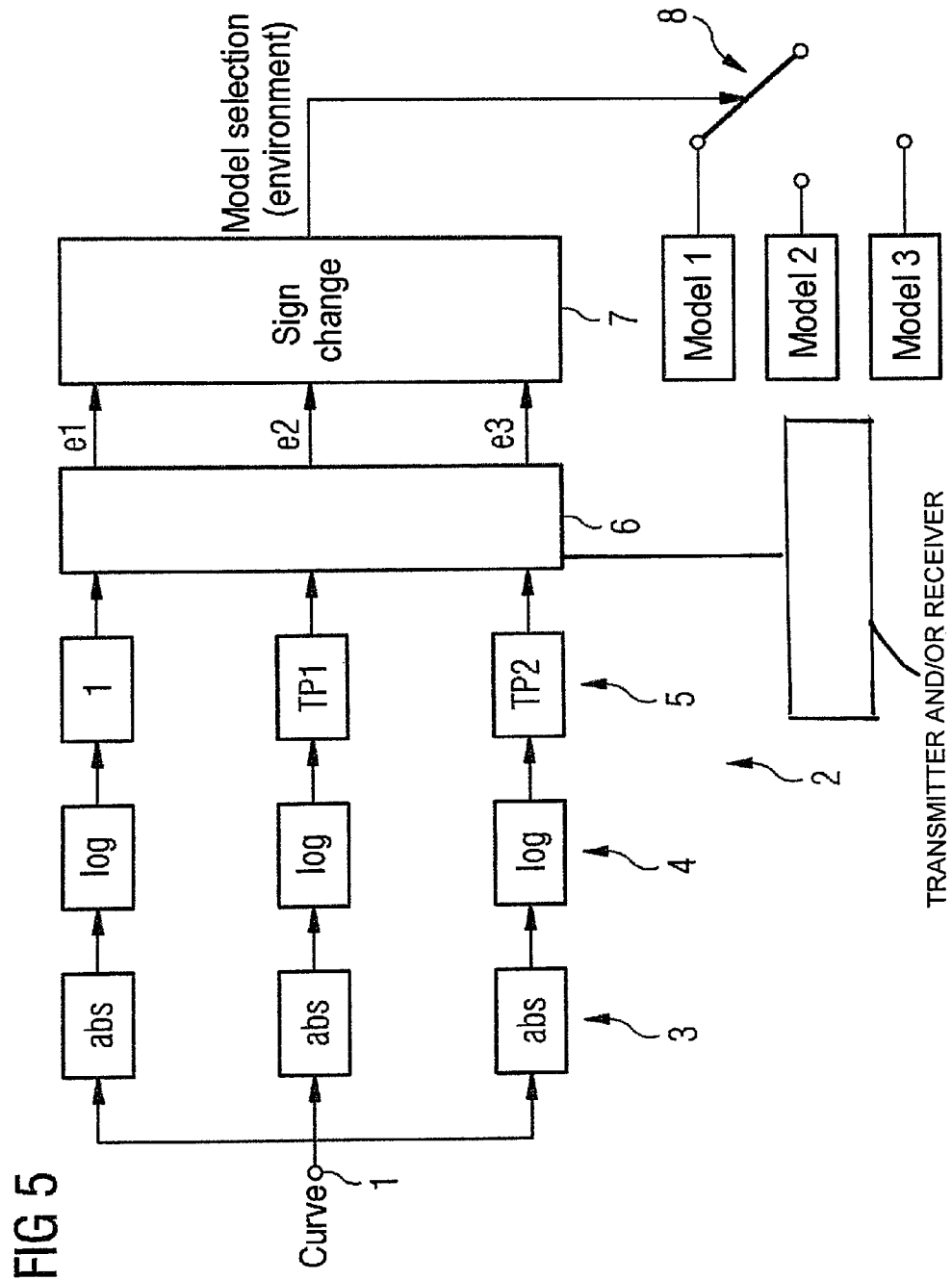
FIG. 5 is a flow diagram for a possible evaluation of the convergence behavior of a parameter according to the present invention.

FIG. 5 describes an option for evaluating the course of convergence of a parameter. To this end, the shape of the curve of individual values of the parameter is determined, each determined value of the parameter being submitted to an evaluation scheme 2 as an input value 1. To this end, the input value in the illustrated example is subjected to three different calculations, each of which is based on the input value. In a first optional step, an absolute value formation 3 of the input value is performed. The absolute value is then subjected to logarithmization 4.

The logarithmized values from the shape of the curve of the parameter are then averaged in an average value formation, averaging periods of various lengths being taken as a basis using the average value filters "1", "TP1", and "TP2".

In a computing unit 6, the differences e between the current curve shape and the average value from the various average value filters "1", "TP1", and "TP2" are formed and are evaluated as differences e1, e2, and e3 in an analyzer 7, which may be integrated into the computing unit 6. For this purpose, a transition or a sign change is in particular determined, which is a measure of the convergence. Based on this information, a suitable model (model 1, model 2, model 3) is selected for the channel estimation in a model selection 8.

By forming the average value of the logarithmized values and forming the difference between each of these values having different averaging time constants and the current curve shape of the parameter, it is possible to derive especially suitable criteria for a model selection in a technically simple manner.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for channel estimation in vehicle-to-environment communication, comprising a computing unit performing the steps of:
    generating a plurality of models of the environment influencing the vehicle-to-environment communication from parameters of vehicle-to-environment communication;
    ascertaining the quality of the models based on convergence of the parameters associated with each model; and
    monitoring the parameters to ascertain a course of convergence of the parameters over time, the course of convergence being ascertained by:
        (a) determining a shape of a curve for individual values of the parameters,
        (b) logarithmizing the individual values from the shape of the curve, (c) averaging the logarithmized values to form an average value using averaging time constants, wherein a difference is formed from the value of the parameter and each of the average time constants, and (d) evaluating a difference between a current curve shape for the parameters and the average value on the basis of a sign change, the sign change being a measure of convergence, wherein the plurality of models are used for channel estimation, wherein a typical environment is assigned to each model, and a model is selected, out of the plurality of models, for channel estimation based on the convergence of the parameters associated with at least one model out of the plurality of models, and wherein the course of convergence of the parameters for the model selected for channel estimation is classified, a value is assigned to each class, and, based on the value of the class, it is determined whether to make a switch with respect to the model selected for channel estimation, and if so, which model to switch to.

2. The method as claimed in claim 1, wherein the convergence of the parameters is evaluated simultaneously for the plurality of models for channel estimation and a model out of the plurality of models having the best convergence is the selected model.

3. The method as claimed in claim 2, wherein a hysteresis value and/or a threshold value is assigned to the course of convergence of the parameters, which hysteresis value and/or threshold value must be exceeded before an additional change of the model for channel estimation occurs.

4. The method as claimed in claim 1, wherein after a change of the model for channel estimation, a new model for channel estimation is optimized using data from the previous model for channel estimation and/or the vehicle-to-environment communication.

5. The method as claimed in claim 1, wherein after a selection of the model for channel estimation, a detailed evaluation is performed of the parameters within the selected model.

6. The method as claimed in claim 1, wherein the course of convergence over time is ascertained individually for each parameter, or the course of convergence for all parameters is combined into an overall convergence.

7. A communications device for vehicle-to-environment communication, the communications device comprising:
   a transmitter and/or receiver configured to transmit and/or receive communication messages in vehicle-to-environment communication; and
   a computing unit configured to carry out the communication, and to implement a method for channel estimation as claimed in claim 1.

* * * * *